United States Patent [19]

Pattison

[11] 4,328,671

[45] May 11, 1982

[54] FLUID PRESSURE INTENSIFIER

[76] Inventor: Jack E. Pattison, 115 S. Ridgeway Dr., Battle Creek, Mich. 49015

[21] Appl. No.: 148,718

[22] Filed: May 12, 1980

[51] Int. Cl.³ .................................. B60T 13/58
[52] U.S. Cl. .................................. 60/563; 60/560; 60/578
[58] Field of Search .............. 60/563, 567, 574, 575, 60/576, 593, 560, 578, 581, 564, 565, 559

[56] References Cited

U.S. PATENT DOCUMENTS

| | | | |
|---|---|---|---|
| 2,290,537 | 7/1942 | Christensen | 60/593 |
| 3,036,436 | 5/1962 | Mitton | 60/563 |
| 3,406,519 | 10/1968 | Hackett | 60/563 |
| 3,478,518 | 11/1969 | Lagerquist | 60/563 |
| 3,534,552 | 10/1970 | Mitton | 60/563 |

FOREIGN PATENT DOCUMENTS

| | | | |
|---|---|---|---|
| 1281724 | 2/1961 | France | 60/593 |
| 565124 | 7/1977 | U.S.S.R. | 60/593 |

*Primary Examiner*—Abraham Hershkovitz
*Attorney, Agent, or Firm*—Marmaduke A. Hobbs

[57] ABSTRACT

A fluid pressure intensifier in which a body has a side wall and first and second end walls. A tube extends inwardly in the body from the first end wall and a piston head is slidably disposed on the tube. A cylindrical element in spaced relation to the body side wall extends from the piston head toward the second end wall. A fluid inlet in the second end wall supplies pressurized fluid to move the piston head on the tube. A fluid outlet through the tube transfers pressurized fluid from within the element out of the intensifier. The amount of pressure intensification is proportional to the surface area differential of the piston head and a cross section of the element.

12 Claims, 5 Drawing Figures

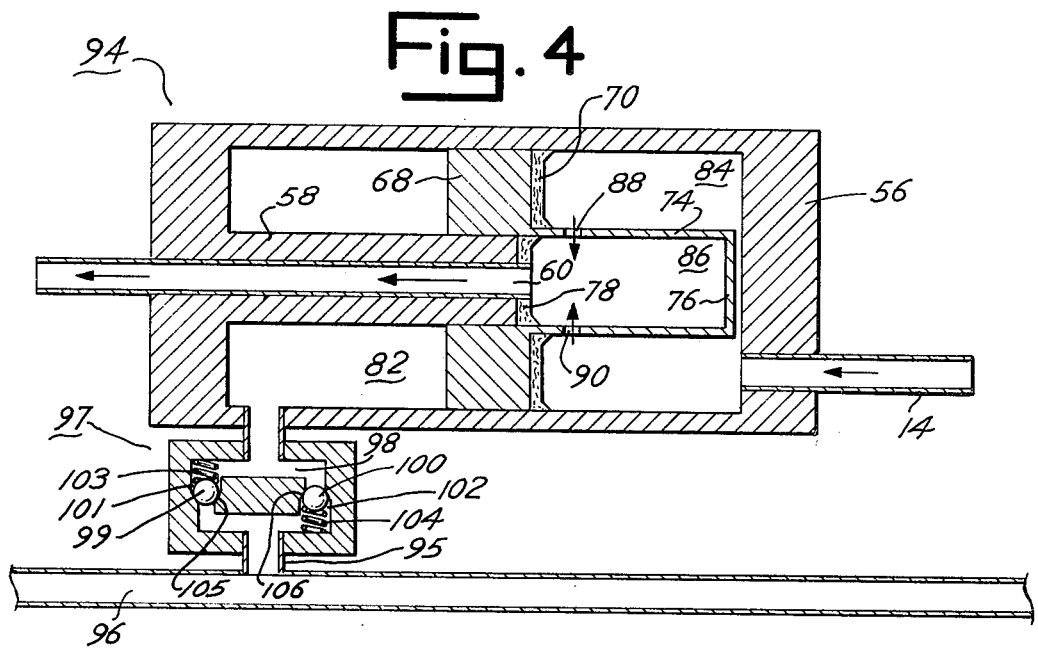
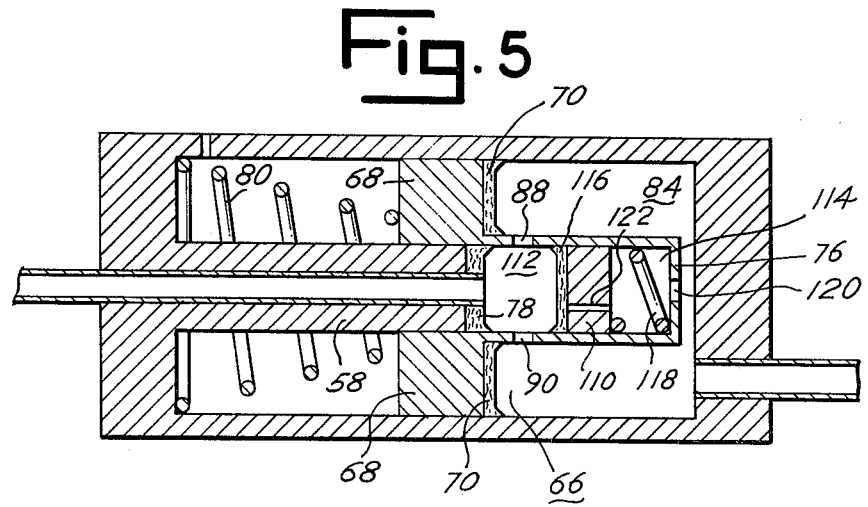

FLUID PRESSURE INTENSIFIER

During the operation of some hydraulic equipment such as hydraulic clamps, presses and braking systems, it is often desirable to have a large volume flow of hydraulic fluid at low hydraulic pressure during the initial stages when positioning and seating are occurring, and to follow with a lesser volume flow at significantly higher pressure during the actual work performance stages. For example, in a drum brake system the brake linings on brake shoes are forced against the brake drum when the brakes are first applied. If the momentum of the vehicle to be slowed by the brake is relatively low, a low hydraulic pressure will be sufficient to stop the momentum in a given time period. If the momentum of the vehicle to be stopped is relatively high, higher fluid pressure is needed to create adequate pressure of the brake shoe against the brake drum to stop the momentum in a similar time period. Similarly, in a hydraulic press or clamp, as the press plate is positioned on the work piece only a low fluid pressure is required. When the actual clamping is to be performed, higher fluid pressures are needed to accomplish the appropriate compression.

Previously, increased hydraulic fluid pressure was achieved by increasing the force applied at the primary fluid pressure activator. Thus, in a brake system having, for example, a foot pedal activator, increased brake pressure was provided only by increasing the pressure applied at the foot pedal, that is, by the operator pressing harder on the pedal with his foot. Pressure in a system is calculated by the formula $P=F/A$ where P is the pressure in the system, F is the force applied and A is the area of the fluid pressurizing surface. Thus, since the value of A is constant, the ratio of pressure increase in the brake system just described is constant, being proportional to the increase in force applied at the pedal.

In some hydraulic devices, it is desirable to have a virtually unlimited fluid flow to the device until a specific fluid pressure is reached, and to have a very limited flow at significantly higher pressure proceed automatically when the designated fluid pressure is reached. In that situation a low ratio of fluid pressure increase is desirable during the low pressure demand stage, and a high ratio of increase is desirable during the high pressure demand stage. It is therefore one of the principal objects of the present invention to provide a fluid pressure intensifier which will provide low fluid pressure that increases in a relatively low ratio of increase during the primary stage of operation, followed by a higher fluid pressure increasing at a relatively higher ratio during the secondary stage, and which can be easily installed in existing hydraulic systems without significant modifications of the existing system.

Another object of the present invention is to provide a fluid pressure intensifier which automatically changes the ratio of fluid pressure increase between a primary pressure activator and a hydraulic device when a predetermined hydraulic pressure is achieved in the intensifier, and which retains the ratio of pressure increase throughout the work range of the hydraulic device.

A further object of the present invention is to provide a fluid pressure intensifier which works equally well on single acting or double acting hydraulic systems, and which will transmit fluid therethrough without alteration of the fluid pressure during the primary stage and will automatically intensify the pressure and the ratio of pressure increase during the secondary stage.

Additional objects and advantages of the present invention will become apparent from the following detailed description and the accompanying drawings wherein:

FIG. 4 is a cross sectional view of a modified form of the fluid pressure intensifier for use in double acting hydraulic systems; and FIG. 5 is a cross sectional view of a further modified form of fluid pressure intensifier.

Figure 1:
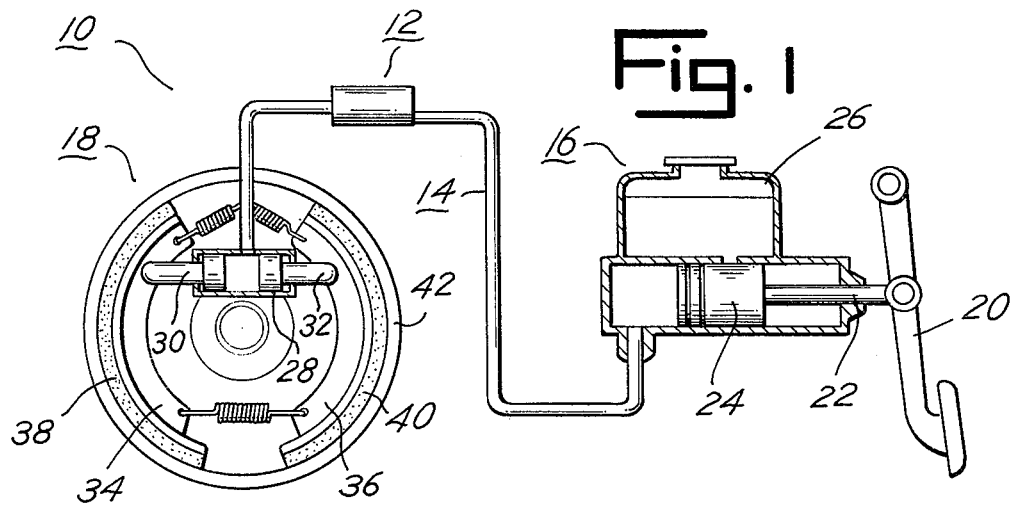
FIG. 1 is a diagrammatic view of a brake system having a fluid pressure intensifier therein.

Referring more specifically to the drawings and to FIG. 1 in particular, numeral 10 designates a drum type brake system having a fluid pressure intensifier 12 embodying the present invention in a brake line 14 between a master cylinder 16 and a wheel unit 18. Although shown in FIG. 1 in the brake line, it should be understood that the intensifier may be included as a part of the master cylinder or the wheel unit, rather than as a separate device, and it will function similarly to the separate unit to automatically increase the ratio of fluid pressure increase between master cylinder 16 and wheel unit 18.

Brake system 10 includes a brake pedal 20 connected by a push rod 22 to a piston 24 in master cylinder 16. Fluid from a reservoir 26 is pressurized by the piston when pedal 20 is depressed, and the pressurized fluid flows through brake line 14 to wheel unit 18, wherein a wheel cylinder 28, having dual pistons 30 and 32, is activated to move the pistons outwardly against brake shoes 34 and 36. Brake linings 38 and 40 on the brake shoes are forced against a brake drum 42 to slow or stop the movement of the drum. Without fluid pressure intensifier 12, as brake pedal 20 is depressed, the fluid pressure in brake system 10 increases in a ratio proportional to the increased force applied at pedal 20 divided by the surface area of the head of piston 24.

Intensifier 12 provides an increased ratio when the system pressure reaches a predetermined level. Fluid pressure intensifier 12 includes a body 50 having a side wall 52 and end walls 54 and 56. Formed integrally with end wall 54 is a tube 58 extending from the end wall inwardly within body 50. The longitudinal opening in tube 58 constitutes an outlet port 60 for the flow of hydraulic fluid from intensifier 12 to wheel unit 18. An inlet port 62 is disposed in end wall 56 for the flow of fluid from master cylinder 16 to intensifier 12, and a vent 64 is disposed in side wall 52.

Figure 2:
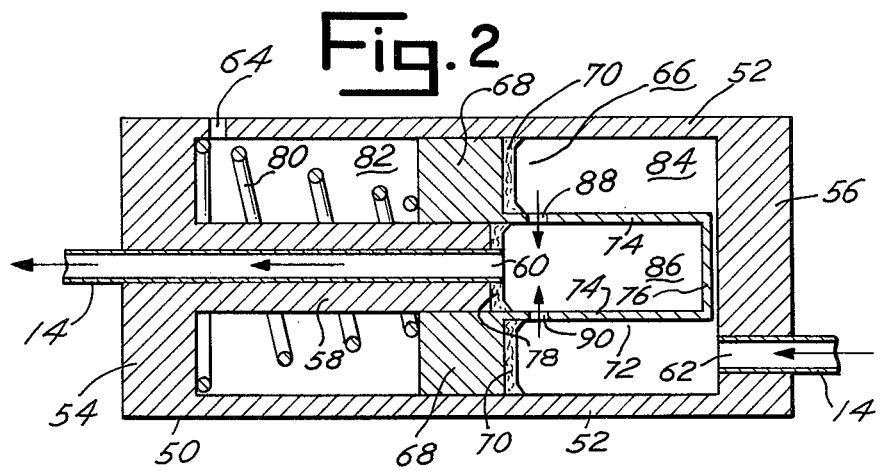
FIG. 2 is a cross sectional view of the fluid pressure intensifier shown in FIG. 1.
Figure 3:
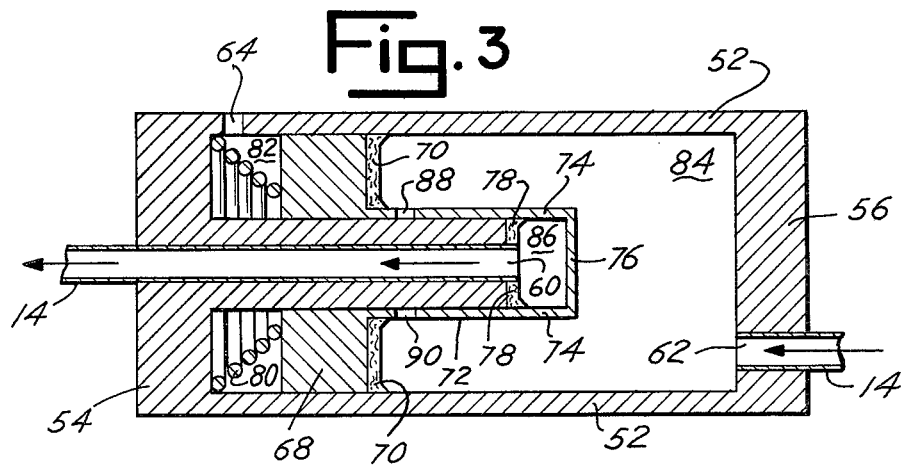
FIG. 3 is a cross sectional view similar to that shown in FIG. 2, but showing the intensifier to be in the secondary stage of operation.

A piston assembly 66, slidable on tube 58, is disposed in body 50 and includes a piston head 68 surrounding the tube and extending from the tube to side wall 52. A seal 70 on head 68 is slidably seated against side wall 52 to prevent seepage of hydraulic fluid between head 68 and the side wall as the piston assembly moves on tube 58. A cylindrical element 72 having a wall 74 and a cap 76 extends from head 68 toward end wall 56. The internal diameter of element 72 is only slightly larger than the outside diameter of tube 58, so that element 72 will slide over the tube, and a seal 78 disposed on the end of tube 58 is seated against the inner surface of wall 74 to prevent the seepage of hydraulic fluid between tube 58 and element 72. A spring 80 is disposed between end wall 54 and piston head 68 to bias piston assembly 66 toward end wall 56. As seen in FIG. 2, tube 58 and piston assembly 66 divide the interior of body 50 into essentially three areas or chambers, namely an unpressurized chamber 82 in which spring 80 is disposed, defined by end wall 54, tube 58 and piston head 68, a primary pressure chamber 84 defined by piston head 68, side wall 52, end wall 56 and element 72, and a secondary pressure chamber 86 within element 72 and defined by side wall 74 of the element, cap 76 and tube 58. Vent 64 is in flow communication with chamber 82, inlet 62 is in flow communication with primary pressure chamber 84, and outlet 60 is in flow communication with secondary pressure chamber 86. Orifices 88 and 90 are disposed in wall 74 near head 68, and place primary pressure chamber 84 in flow communication with secondary pressure chamber 86.

In the use and operation of a fluid pressure intensifier embodying the present invention, a pressure fluid operated device is easily modified to include the intensifier. An appropriate fluid line is severed, with perhaps a small portion removed to provide adequate room for the intensifier, and the line is then attached by appropriate fluid line connectors to the intensifier. In the brake system shown in FIG. 1, line 14 may either be severed or replaced to include the intensifier. During the initial or primary stage of braking, when pedal 20 is only slightly depressed, the flow of hydraulic fluid through intensifier 12 will be substantially as shown by the arrows in FIG. 2. The fluid enters the intensifier through inlet port 62, flowing into primary chamber 84. Orifices 88 and 90 permit the flow of fluid through element 72 into secondary chamber 86, and from there the fluid flows through outlet port 60 in tube 58 to the wheel unit 18. At this stage of operation the brake system operates substantially the same as it would if intensifier 12 were not installed in the brake line, in that the hydraulic fluid flows through the intensifier without action by the intensifier.

As the fluid pressure in the system increases, the pressure in primary chamber 84 increases, and the increasing pressure causes the piston assembly 66 to slide on tube 58 toward end wall 54, thereby compressing spring 80. Hence, the activation pressure for intensifier 12 is determined by the resistance exerted on the piston assembly by spring 80. When the fluid pressure in area 84 exceeds the resistance of spring 80, the piston assembly will begin to move on tube 58. When piston assembly 66 has moved a sufficient distance on tube 58, orifices 88 and 90 will be positioned along the outer surface of tube 58, hence stopping the flow of fluid from primary chamber 84 to secondary chamber 86. Intensifier 12 will now operate to increase the ratio of fluid pressure increase in brake system 10. As increased force is applied to brake pedal 20, thereby further increasing the fluid pressure in primary chamber 84, piston assembly 66 is moved farther on tube 58. The fluid in secondary chamber 86 will also increase in pressure, since the size of the chamber decreases with the movement of cap 76. The ratio of pressure increase between the fluid in primary chamber 84 and the fluid in secondary chamber 86 will be determined generally by the differential of the areas of the head of piston 68 (plus the area of cap 76) and the area of cap 76. This is evident from the formula for pressure in a system which is $P=F/A$. The force in brake system 10 is the force applied by the operator on pedal 20. Chambers 84 and 86 are isolated from each other when orifices 88 and 90 are closed, and the force applied to piston head 68 equals the force applied to cap 76. The difference in the surface areas of piston head 68 and cap 76 creates a pressure differential between primary chamber 84 and secondary chamber 86 substantially equal to the ratio of the differential in the areas. For example, if the surface area of piston head 68 is equal to two times the surface area of cap 76, the pressure in secondary chamber 86 will be two times the pressure in primary chamber 84. The increased pressure is transferred through outlet 60 and line 14 to wheel unit 18.

When the force is released from pedal 20, the fluid in intensifier 12 will reverse its direction of flow, and primary chamber 84 will depressurize before secondary chamber 86, and the relatively higher pressure in the secondary chamber will move piston assembly 66 toward end wall 56. This movement is assisted by spring 80, so that orifices 88 and 90 will quickly move past tube 58 to place chambers 84 and 86 in flow communication. From that time, the decrease in system fluid pressure will be substantially equal to that of the system without an intensifier therein. Chamber 82 of intensifier 12 will normally not contain fluid. As piston assembly 66 moves in the direction of end wall 54, some of the air in chamber 82 will be expelled through vent 64, and as piston assembly 66 moves in the direction of end wall 56, air will enter chamber 82 through vent 64. While vent 64 is shown vented to the atmosphere, it may be connected to the source of operating fluid at normal pressure, and chamber 86 will be filled with hydraulic fluid. This alternate arrangement provides a closed system which otherwise operates the same as described herein.

In a dual acting hydraulic system, slight modification of the intensifier involves the elimination of spring 80. Hence, as shown in FIG. 4, an intensifier 94 has a branch 95 from a return line 96 of the hydraulic device connected in flow communication with chamber 82. A check valve 97 is disposed in line branch 95 to control the flow of fluid between chamber 82 and return line 96, and includes a branched passageway 98 for the flow of the fluid. Shutoff ball valves 99 and 100 are disposed in enlarged areas 101 and 102 of passageway 98, and are biased in opposite directions by springs 103 and 104 against tapering sidewalls 105 and 106 of enlarged areas 101 and 102, respectively. Hence, by selection of an appropriate spring 104 a predetermined pressure build up in chamber 82 will occur before the resistance of the spring is overcome to dislodge ball valve 100 and permit the flow of fluid from chamber 82 to return line 96. Similarly, when the return pressure in line 96 overcomes the force of spring 103, ball valve 99, which operates simply as a check valve, will be dislodged from sidewalls 105 and permit the flow of fluid from the return line to chamber 82. Intensifier 94 is otherwise similar to intensifier 12, except that vent 64 is eliminated. When the pressure in primary chamber 84 exceeds the return fluid pressure in chamber 82 supplied from return line 96, piston assembly 66 will slide on tube 58, and orifices 88 and 90 will be closed to provide the pressure intensification as previously described. When the force supplied to the system is released, so that the return pressure in chamber 82 exceeds the pressure in chamber 84, the return pressure will force piston assembly 66 towards end wall 56. Orifices 88 and 90 will move past tube 58 to place primary chamber 84 in flow communication with secondary chamber 86, in readiness for a subsequent activation.

FIG. 5 shows a modification of piston assembly 66, which permits seal 78 to slide past orifices 88 and 90 at a relatively low pressure differential between primary chamber 84 and secondary chamber 86, hence prolonging the life of seal 78. In this modification, a piston 110 is disposed in chamber 86 and divides the chamber into two areas 112 and 114. A seal 116 on piston 110 prevents seepage of fluid along wall 74 between areas 112 and 114, and a spring 118 is disposed in area 114 between piston 110 and cap 76, to bias piston 110 toward tube 58. An orifice 120 is disposed in cap 76 to place primary chamber 84 in flow communication with area 114. An orifice 122 disposed in piston 110 places area 112 in flow communication with area 114, by displacement of seal 116, in the event the pressure in chamber 84 becomes greater than the pressure in area 112 while orifices 88 and 90 are closed by seal 78 and tube 58. In this modified form, as the pressure increases in primary chamber 84 sufficiently to overcome the resistance of spring 80, piston assembly 66 will begin to slide on tube 58. The resulting pressure increase in area 112 forces piston 110 toward orifice 120, and some of the fluid in area 114 will pass through orifice 120 into chamber 84. Hence, the pressures in chamber 84, and areas 112 and 114 will not vary substantially until spring 118 is fully compressed and piston 110 ceases rearward movement. Orifices 88 and 90 will be closed, having moved past the end of tube 58, and the pressure in area 112 will increase; however, during movement of orifices 88 and 90 past seal 78, the fluid pressures in area 112 and chamber 84 will be substantially equal, so that very little distortion of seal 78 occurs, thus substantially prolonging the life of seal 78. As a safety feature, in the event the piston has traveled fully to the left as viewed in FIG. 5, further fluid can pass from chamber 84 to line 14 by the fluid unseating seal 116 and flowing through passage 122.

Although one embodiment and several modifications of a fluid pressure intensifier have been described in detail herein, various other changes may be made without departing from the scope of the present invention.

I claim:

1. A fluid pressure intensifier comprising a side wall and first and second end walls forming a body for receiving and transmitting pressurized fluid, a tube extending inwardly in said body from said first end wall, a piston assembly including a piston head slidable on said tube and a piston wall in spaced relation to said body side wall extending from said piston head toward said second end wall, said assembly being slidable in said body with an increase in pressure of fluid supplied to said body, said assembly dividing the interior of said body into a primary pressure chamber and a secondary pressure chamber, the cross sectional surface area of said primary pressure chamber being larger than the cross sectional surface area of said secondary pressure chamber, a portion of said piston assembly forming a moveable wall of said secondary pressure chamber to decrease the volume of said secondary pressure chamber as the fluid pressure supplied to said intensifier increases, a fluid inlet means near said second end wall communicating with said primary pressure chamber for supplying fluid to said body, a fluid outlet means including a longitudinal opening through said tube and said first end wall communicating with said secondary pressure chamber for transmitting fluid from said body, fluid flow means in said piston wall for the passage of fluid freely between said primary and secondary pressure chambers during primary operation stages of said intensifier, shut off means for stopping the passage of fluid through said fluid flow means during secondary operation stages when a predetermined fluid pressure is exceeded in said primary pressure chamber and an increased output fluid pressure is required, and return means for moving said piston assembly to its starting position for the primary operation stage when the pressure of fluid supplied to said body decreases, and for opening said fluid flow means when the fluid pressure in said primary pressure chamber is less than the predetermined pressure.

2. A fluid pressure intensifier as defined in claim 1 in which said piston head extends laterally from said tube to said side wall, a seal on said piston head is slidably seated against said side wall, said piston wall forms a cylindrical element extending from said piston head toward said fluid inlet means, the interior of said cylindrical element forms said secondary pressure chamber, said element is slidable on said tube and in spaced relation to said body side wall, and a cap on said element side wall constitutes said moveable wall of said secondary pressure chamber.

3. A fluid pressure intensifier as defined in claim 2 in which said fluid flow means includes a portion of said side wall of said element near said piston head forming an orifice for the passage of fluid from said primary pressure chamber to said secondary pressure chamber.

4. A fluid pressure intensifier as defined in claim 3 in which said return means includes a spring disposed around said tube between said end wall from which said tube extends and said piston head.

5. A fluid pressure intensifier as defined in claim 3 in which said return means includes a third chamber in said body defined by said tube, said end wall from which said tube extends, said body side wall and said piston head, and fluid flow means for supplying pressurized fluid to said third chamber.

6. A fluid pressure intensifier as defined in claim 2 in which a piston is disposed in said cylindrical element, a seal on said piston slidably seats against said element side wall, and a spring is disposed between said piston and said cap.

7. A fluid pressure intensifier as defined in claim 4 in which a piston is disposed in said cylindrical element, a seal on said piston slidably seats against said element side wall, a spring is disposed between said piston and said cap, and an orifice is disposed in said cap.

8. A fluid pressure intensifier comprising a body having a side wall and first and second end walls, a tube extending from said first end wall inwardly in said body, the inner end of said tube being in spaced relation to said second end wall, a piston head disposed on said tube and longitudinally slidable thereon, a seal disposed on said piston head and slidably seated against said side wall, a cylindrical element in spaced relation to said body side wall extending from said piston head toward said second end wall and being slidable on said tube, a seal disposed on the end of said tube slidably seated against said cylindrical element, fluid flow means in said cylindrical element for the transfer of fluid freely between the area within said cylindrical element and the area outside of said element between said piston head and said second end wall in the unactuated portion of the piston head, a fluid inlet means near said second end wall communicating with the area between said piston head and said second end wall for supplying fluid to said intensifier, and a fluid outlet means including a longitudinal opening through said tube communicating with the area within said cylindrical element for transmitting fluid from said intensifier.

9. A fluid pressure intensifier as defined in claim 8 in which a spring is disposed between said piston head and said first end wall.

10. A fluid pressure intensifier as defined in claim 8 in which a piston is disposed in said cylindrical element, a seal on said piston seats slidably against said element, said fluid flow means is disposed between said piston in said cylindrical element and said piston head, a second fluid flow means is disposed in said element on the opposite side of said piston from said first mentioned fluid flow means for transmitting fluid into and out of said element, and a spring biases said piston toward said tube.

11. A fluid pressure intensifier as defined in claim 9 in which a piston is disposed in said cylindrical element, a seal on said piston seats slidably against said element, said fluid flow means is disposed between said piston in said cylindrical element and said piston head, a second fluid flow means is disposed in said element on the opposite side of said piston from said first mentioned fluid flow means for transmitting fluid into and out of said element, and a spring biases said piston toward said tube.

12. A fluid pressure intensifier as defined in claim 8 in which a fluid flow means for supplying pressurized return fluid is in flow communication with the area between said piston head and said first end wall.

* * * * *